United States Patent Office 3,457,267
Patented July 22, 1969

3,457,267
5-SUBSTITUTED-2-OXAZOLIDINONES
Carl D. Lunsford and Marvel L. Fielden, Richmond, Va., assignors to A. H. Robins Company, Incorporated, Richmond, Va., a corporation of Virginia
No Drawing. Original application Apr. 29, 1965, Ser. No. 451,970. Divided and this application June 13, 1967, Ser. No. 645,619
Int. Cl. C07d 99/02, 85/28; A61k 27/00
U.S. Cl. 260—294          18 Claims

ABSTRACT OF THE DISCLOSURE 5-substituted-2-oxazolidinones of the formula:

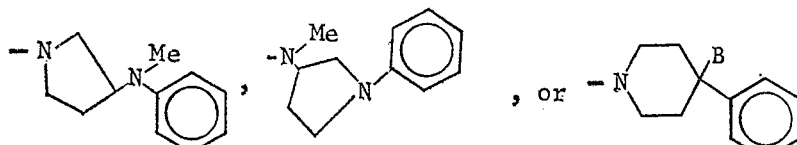

where R is a hydrogen, alkyl, or phenylalkyl or substituted phenylalkyl, where R′ and R″ are independently hydrogen or methyl, and where Q is either

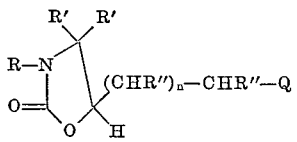 , 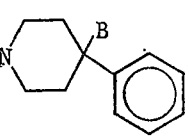 , or 

where B is hydrogen, hydroxy, lower-alkanoyloxy, carboxy, lower-carbalkoxy, wherein the phenyl radical may bear substituents, and wherein other lower-alkyl groups may be present attached to the nitrogen atom instead of the methyl group shown, and pharmaceutically acceptable acid addition salts thereof. The compounds have utility as tranquilizers.

---

This application is a division of copending application Ser. No. 451,970, filed Apr. 29, 1965, now U.S. Patent 3,419,559.

The present invention relates to certain 5-substituted-2-oxazolidinones, and is more particularly concerned with 5 - (omega-substituted lower-alkyl)-2-oxazolidinones, intermediates therefor, compositions thereof, and the production and use of the same. Of especial interest are the compounds designated the 5 - [omega - (4-aryl-1-piperazino) - lower alkyl]-2-oxazolidinones and acid addition salts thereof, certain related 5-(omega-substituted lower-alkyl)-2-oxazolidinone compounds and, in those cases where amino nitrogen atoms are present, their acid addition salts as well.

The invention is especially concerned with 5-[omega-(4 - aryl - 1 - piperazino)-lower-alkyl]-2-oxazolidinone compounds having the formula:

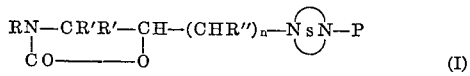     (I)

where n is 1 or 2; R is preferably hydrogen or lower-alkyl, but may also be cycloalkyl, phenylalkyl, or substituted phenylalkyl; R′ is hydrogen or methyl, preferably hydrogen; R″ is hydrogen or methyl, preferably hydrogen;

—N s N— is a saturated heterocyclic ring of carbon and nitrogen having 6 or 7 ring atoms, the two nitrogen atoms being separated by at least two carbon atoms, and having 4 up to a total of 8 carbon atoms, some of which may be present as C-lower-alkyl substituents, preferably methyl; and P is phenyl, substituted phenyl, quinolyl, or pyridyl, and acid addition salts thereof.

The compounds of Formula I are primarily useful as major tranquilizers. The compounds of Formula I wherein R is other than hydrogen do not appear to have the same high order of activity as the corresponding compounds wherein R is hydrogen, as further discussed hereinafter. Compounds wherein R is methyl or ethyl are preferred after the compounds wherein R is hydrogen.

Also included within the scope of the present invention are compounds of Formula II, including acid addition salts thereof:

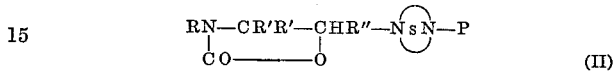     (II)

wherein all the symbols are the same as in Formula I. The compounds of Formula II, having a single —CHR″— group in the 5 position, do not appear to have the same type of activity as the compounds of Formula I, especially Formula I wherein R is hydrogen, as more fully discussed hereinafter.

The compounds of Formula II are primarily useful as minor tranquilizers.

PHARMACOLOGICAL RESULTS

Two distinct types of tranquilizer activity have been observed during the pharmacological testing of compounds of the present invention. The type of activity appears to correlate with the chemical structure of the compounds tested.

Compounds which antagonize thiosemicarbazide (TSC)-induced convulsions in mice may be classified as minor tranquilizers.

This test consists of including convulsions in mice (6 drug-treated and 2 controls) by administering 20 mg./kg. of TSC intraperitoneally 1 hour after the drug is administered intraperitoneally. The animals are observed 24 hours later and survival rate is determined. In the control animals, TSC at the above dose invariably results in convulsions, terminating in death within 24 hours.

Known drugs which are generally classified as minor tranquilizers, for example Librium (TM) and Valium (TM), have been shown to protect against TSC convulsions in mice as described above. The compounds of Formula II, especially Formula II wherein R″ is hydrogen, were found to be active in this test; for example, AHR–1421 (Example 20) and AHR–1422 (Example 21) protected 100% of the animals given 50 mg./kg. of these drugs, whereas 100% of the control animals expired within the 24 hour period of observation. All compounds tested which have shown this activity possess a further substituted 5-methylene group. These compounds which are active in this minor tranquilizer screen test are not active in the test for major tranquilizers as described hereinafter.

Compounds which block aggressive behavior in fighting mice may be classified as major tranquilizers [Yen, C. Y., et al., Arch. Int. Pharmacodn. 123, 179 (1959)]. All analogs of AHR–1209, i.e., compounds with a further substituted 5-ethylene group, clearly possess this property and are classified as major tranquilizers. These compounds do not protect against TSC-induced convulsions.

The uses and activities of other of the compounds of this development are disclosed hereinafter.

Also included within the scope of the invention are compounds of the formula:

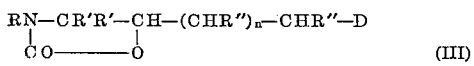  (III)

wherein D is cyano, carboxyl, carbonyl halide, or carbalkoxy; R, R' and R" and n all have the meanings previously assigned in Formula I.

The compounds of Formula III are primarily useful as intermediates for the synthesis of compounds having Formula I wherein n is 2, as described hereinafter.

Also included within the scope of the invention are compounds of the formula:

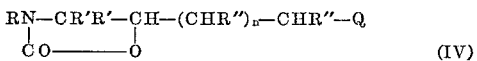  (IV)

wherein n is 0, 1 or 2, wherein Q is

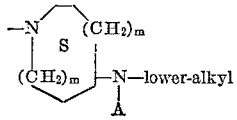

or

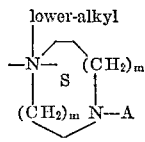

wherein m is zero or one, no more than one m being one, and A is phenyl or substituted phenyl, the remaining symbols R, R' and R" being the same as in Formula I, and acid addition salts thereof.

The compounds of type IV are primarily useful as tranquilizers.

Also included within the scope of the present invention are compounds of the formula:

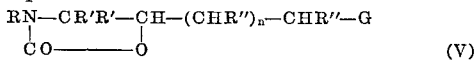  (V)

wherein n is 0, 1 or 2, wherein G is

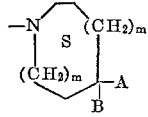

wherein m is zero or one, no more than one m being one; A is phenyl or substituted phenyl; B is hydrogen, hydroxy, lower-alkanoyloxy, carboxy, and carbalkoxy; the remaining symbols R, R', and R" being the same as in Formula I, and acid addition salts thereof.

The compounds of Formula V are primarily useful as analgesics.

It is accordingly an object of the present invention to provide novel and useful compounds, compositions thereof, methods of producing the same, and methods for the utilization thereof. Additional objects will become apparent hereinafter and still others will be apparent to one skilled in the art.

In the definition of symbols in the formulas hereof and where they appear elsewhere throughout this specification, the terms have the following significance.

A "substituted phenyl" radical is a phenyl radical substituted by any radical or radicals which are not reactive or otherwise interfering under the conditions of reaction, such as nitro, lower-alkoxy, lower-alkylmercapto, lower-alkyl, di-lower-alkylamino, trifluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkylamino substituents each have preferably from one to four carbon atoms which can be arranged as straight or branched chains. A total of nine carbon atoms in all ring substituents, making a total of fifteen carbon atoms in the radical, is the preferred maximum. When pyridyl or quinolyl is referred to, the 2-, 3- or 4-pyridyl or quinolyl radicals are included. The term "lower-alkyl" as used herein includes straight and branched chain radicals of up to eight carbon atoms inclusive, preferably no more than six carbon atoms, and is exemplified by such groups as methyl, ethyl, propyl, isopropyl, tertiary butyl, amyl, isoamyl, hexyl, heptyl, octyl, and the like. A "lower-alkoxy" group has the formula lower-alkyl-O-. A lower-alkanoyloxy group has the formula lower-alkyl-COO—.

The symbol

is as previously defined and includes such radicals as piperazino, 2,3,5,6-tetramethylpiperazino, 2- or 5-methyl-piperazino, 2- or 5-ethylpiperazino, 2,5-dimethylpiperazino, 2,5-diethylpiperazino, 2-propylpiperazino, 2-butylpiperazino, 3-methylpiperazino, homopiperazino, and the like. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. Included in the term "phenylalkyl" are lower-alkyl substituted monocarbocyclic aryl groups such as benzyl, phenethyl, methylbenzyl, phenpropyl, and the like. "Substituted phenylalkyl" groups may contain all of the substituents and variations thereof already disclosed for a "substituted phenyl" radical. When halogen is referred to herein, preferably but not necessarily a halogen of atomic weight in excess of nineteen but not greater than eighty is employed. Of the halogens, chlorine is preferred.

METHOD OF PREPARATION

The compounds of all of the foregoing Formulas I–V may be prepared according to the following general scheme.

Step B

A starting oxazolidinone compound of the formula:

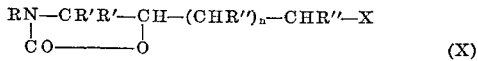  (X)

wherein R, R', and R" have the meanings assigned in Formula I, n is 0, 1 or 2, and X is a halogen atom, is reacted in a conventional halogen displacement reaction with a compound of the formula:

  (XI)

wherein Z is an atom such as H (as when Y is a secondary amine radical) and Na or K (as when Y is cyano) or the like, to split out a halide (Z⁺X—), and Y is the remainder of the molecule which is desired to be introduced into the alkyl chain at the 5 position of the oxazolidinone ring. As will be clear from the foregoing, in the process employed to produce compounds of the foregoing formulae, this remainder of the molecule is designated

P, D, Q, and G, and comprises certain tertiary amine radicals and cyano.

The compound thus produced has the formula:

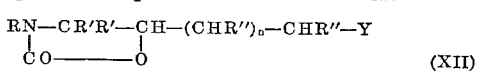  (XII)

wherein all symbols have the values given in Formulas X and XI.

Step C

In the vent R in Formula XII is benzyl, the R group may be converted from benzyl to hydrogen with an alkali metal, e.g., sodium, and liquid ammonia.

The process of Step C may be generally described as a process for the production of a 5-omega-substituted-2-oxazolidinone selected from the group consisting of (A) compounds of the Formula XII as this formula is set forth and defined herein, wherein R is hydrogen, and (B) acid addition salts thereof, which comprises the step of subjecting a starting compound of said Formula XII, wherein R is a benzyl radical, to debenzylation.

Step A

Step A may be generall described as a process for the production of a 5-(2-haloethyl-2-oxazolidinone which comprises the steps of (1) reacting (a) a 3-pyrrolidinol with (b) a carbonyl dihalide and (2) subjecting the product of the reaction to (c) a tertiary amine.

Starting compound X is provided in any one of a variety of ways. It is preferably provided by reacting a 3-pyrrolidinol with phosgene and the intermediate reaction product then reacted with a tertiary amine, e.g., pyridine or other tertiary heterocyclic amine, dimethylaniline or other dialkylarylamine, or triethylamine or other trialkylamine, to produce the desired starting 5-(haloalkyl)-oxazolidinone X. The reaction is as follows:

Step A

HO—CH—CHR″—CHR″ + C—X₂ → X—C—O—CH—CHR″—CHR″
  |         |              ||      ||     |         |
  R′CR′————NR             O      O    R′CR′————N—R
    XIII                          XIV

N-(alkyl)₃
                  XVI

RN—CR′R′—CH—CHR″——CHR″—X
  |                      |
  CO————————————————————O
Compound X wherein X in Formula XIV is halogen, preferably bromine or chlorine, and wherein R, R′ and R″ all have the meanings previously assigned in Formula I. Step A is an entirely novel process which has proved to be of great value in the convenient production of compounds of Formula X from readily available 3-pyrrolidinal starting materials, and is adaptable to considerable variations in the molecule. The starting 3-pyrrolidinols XIII wherein R′ and R″ are other than hydrogen may be obtained by the procedure of C. W. Ryan et al., J. Org. Chem. 27, 2901–2905 (1962) or according to Lunsford U.S. Patent 2,830,997 and other sources cited therein.

Numerous alternatives are available to Step A. These will be designated Steps A1 through A7. In all of these alternative steps, n is 0 or 1, and R′, R″ and X have the same meanings as given for Step A reactions.

Alternative Steps A1–A7

(XVII)  R′CR′—CH—(CHR″)ₙ—CHR″—X
              \\O/

Step A1: RNCO ↓

RN—CR′R′—CH—(CHR″)ₙ—CHR″—X
  |                        |
  CO——————————————————————O

Step A2: urethane (EtOCONH₂) + LiNH₂
Step A3: alkali metal cyanate plus acid
Step A4: urea

RN—CR′R′—CH—(CHR″)ₙCHR″X
  |                      |
  CO————————————————————O

Z—Y          (X) R=H
  (Step B)

(Step B)      Z—Y (XII) R=other than H
                      (XII) R=H

↙ (Step C) debenzylation of compound XII (where R=benzyl)

(XII) R=H (XVIII)  R′CR′—CH—(CHR″)ₙ—CHR″—X
           |       |
          OH      OH

Step A5: urea ↓

(Step B)
         (X) R=H ————————————→ (XII) R=H
                      Z—Y (XIX)   R′CR′—CH—(CHR″)ₙ—CHR″—X
           |       |
           X      OH Step A6: urea ↓

Z—Y
          (X) R=H ————————————→ (XII) R=H
                     (Step B)

(XX)   R′CR′—CH—(CHR″)ₙ—CHR″—X
          |              |
       H₂NCOO           OH

Step A7: urea ↓

Z—Y
          (X) R=H ————————————→ (XII) R=H
                     (Step B)

Alternative Steps A′1–A′7

Instead of the group —CHR″—X in the starting compounds XVII, XVIII, XIX and XX, the group
—CHR″Y in which Y has the value previously assigned, may be present therein. This group —CHR″—Y is introduced into compounds XVII, XVIII, XIX or XX, by reaction thereof with Z—Y (Compound XI) in the same manner as given under "Step B." Obviously, when operating in this manner, compound XII is prepared directly in the Steps A′1–A′7, all of which are ring closure reactions.

Steps A′1 through A′7 may be generally described as a process for producing a 5 - omega - substituted - 2 - oxazolidinone selected from the group consisting of (A) compounds of the Formula XII, as this formula is set forth and defined herein, and (B) acid addition salts thereof, which comprises the step of conducting a ring closure reaction selected from the group consisting of the following: (1) reaction of a compound of the formula

R′CR′—CH—(CHR″)ₙ—CHR″—Y
  |        |
  T       OH wherein T is selected from the group consisting of halo, hydroxy, and carbomoyloxy, with the reagent urea, and (2) reaction of a compound of the formula

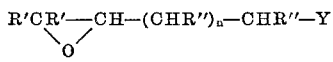

with a reagent selected from the group consisting of (a) urea, (b) urethane ($EtOCONH_2$)+$LiNH_2$, (c) alkali metal cyanate plus an acid, and (d) isocyanate $R_4NCO$, wherein $R_4$ is the same as R, as defined for Formula XII, Y in all cases having the same values as in Formula XII, $n$ being selected from 0 and 1. The process is preferably applied to produce a Formula I compound, wherein Y is equal to

as herein defined for Formula I, the selected starting materials in the process in such cases having a value of

for Y, and $n$ being 1.

Step A.—5-HALOALKYL-2-OXAZOLIDINONE PRODUCTION

As a general procedure for this novel reaction, the following is representative:

A solution of 1–1.25 parts of carbonyl dihalide, e.g., phosgene (carbonyl dichloride) or carbonyl dibromide, dissolved in chloroform, toluene, benzene, tetrahydrofuran, or other non-reactive organic solvent is prepared in a suitable container such as a three-neck, round-bottom flask equipped with mechanical stirrer, dropping funnel, pot thermometer and condenser, and to this solution is added one part of the properly substituted 3-pyrrolidinol (XIII).

The reaction mixture is cooled in an ice bath and the addition is at such a rate that the pot temperature is kept between 0 and 25° C. or with sufficient cooling to control the exothermic reaction. After the addition of 3-pyrrolidinol is complete, stirring is continued at the above temperature for one-half to one hour. Then, with continued cooling and stirring, two parts of a tertiary amine such as pyridine or other tertiary heterocyclic amine, dimethylaniline or other dialkylarylamine, or triethylamine or other trialkylamine is added and the mixture allowed to warm to room temperature. The solution is extracted with dilute acid, then dilute base, and finally with water. The organic layer is dried over sodium sulfate or other suitable drying agent and the solvent removed at reduced pressure. The residual neutral material may then either be distilled in vacuo or purified by crystallization from a non-polar organic solvent. The yield of the purified product ranges from approximately 25–70% of the calculated amounts. Preparations I–X should be consulted for further particulars and details.

ALTERNATIVE 5-SUBSTITUTED ALKYL-2 OXAZOLIDINONE PRODUCTION STEPS AL–A7 AND A′1–A′7

These alternative procedures, as outlined briefly elsewhere herein, involve ring closure to produce an oxazolidinone ring. The procedure may be applied to compounds XVII, XVIII, XIX, and XX as Steps A1 through A7, to produce the corresponding 5-haloalkyl-2-oxazolidinone compounds or to the compounds XVII, XVIII, XIX, and XX, wherein the —CHR″—X radical is replaced by a —CHR″—Y radical, as Steps A′1 through A′7, to produce the corresponding 5-substituted alkyl-2-oxazolidinones wherein the 5 side chain is

—(CHR″)—CHR″—Y all as hereinbefore described.

These procedures are of a generally known and conventional type and only a general and representative outlines thereof will be given here.

Representative for Steps A1 and A′1

A selected 1-halo-3,4-epoxybutane (XVII) and the selected isocyanate, usually in about equimolar quantities, are heated at elevated temperatures, for example, at 150–200° C., in a closed system with catalytic quantities of a base, such as benzyldimethylamine, or the like. After 10 to 18 hours at elevated temperatures, the reaction mixture is cooled and the desired product is purified either by crystallization from a non-polar solvent or by distillation at reduced pressure. Shorter reaction periods are usually employed at higher reaction temperatures and vice versa. The isocyanate may sometimes advantageously be employed in excess.

Representative for Steps A2 and A′2

A mixture of one part of urethane ($EtOCONH_2$) and a catalytic amount (approximately 0.05 part) of lithium amide is heated to approximately 120° C. with stirring. One part of 1-halo-3,4-epoxybutane (XVII) is added dropwise to the above mixture with rapid stirring. During addition the temperature is gradually raised until ethanol is evolved (140 to 150° C.) and this temperature is maintained until addition of the epoxide is complete and evolution of ethanol has stopped. The reaction mixture is then cooled to approximately 100° C. and a mixture of alcohol and water (5 to 1 ratio) is added with stirring. This mixture is then extracted with chloroform, the chloroform solution washed with water then dried with sodium sulfate. The chloroform is removed at reduced pressure leaving the desired product as a viscous oil. The yield of crude product is approximately 80%.

The following example is representative:

A mixture of 0.1 mole of a compound of formula XVII and 17.8 g. (0.2 mole) of ethyl carbamate (urethane) is heated to 175° and 0.2 g. of potassium hydroxide dissolved in 5 ml. of methanol is added. The temperature is maintained at 175–190° for 2 hours and the product isolated in conventional manner by chloroform extraction, drying, filtering and concentrating.

Representative for Steps A3 and A′3

This reaction involves a compound of Formula XVII and an alkali metal cyanate plus an acid, preferably a mineral acid such as hydrochloric acid. Preferably the alkali metal cyanate is used in excess; usually the molar ratio is about 2:1. A representative reaction is as follows:

A mixture of 0.1 mole of a compound of Formula XVII and (0.2 mole) of sodium or potassium cyanate and 100 ml. of ethanol is treated with 10 ml. of concentrated hydrochloric acid, refluxed for four hours, concentrated, and the residue partitioned between water and chloroform. The chloroform extract is dried over anhydrous sodium sulfate and concentrated.

Representative for Steps A4, 5 and 6 and A′4, 5 and 6

The compounds of Formula XII, R=H, e.g., 5-(4-phenylpiperazino)alkyl - 2 - oxazolidinones, wherein the 3-position is substituted only by hydrogen, may be prepared by reacting a selected compound (XVII), (XVIII), or (XIX), e.g., 1-aryl-4-(1,2-dihydroxyalkyl)-piperazine, and urea, usually in at least equimolar ratios, preferably but not necessarily in an approximately 1:2 molar ratio, by heating at an elevated temperature, usually about 170° C. to 200° C. and preferably at about 185° C., with or without a solvent. A fusion process is preferably employed. The time required for complete reaction is usually at least three hours and the technique of rapidly heating the reaction mixture to the desired reaction temperature is advantageously followed. On completion of the reaction, the crude oxazolidinone may be purified by usual procedures.

The reaction of a 1,2-epoxy compound (XVII) with urea is illustrated by the following:

A mixture of 0.1 mole of a compound of Formula XVII and 12.0 g. (0.2 mole) of urea is heated to 175°. The resulting exothermic reaction is moderated by external cooling after which the temperature is maintained at 175–180° for two hours. The reaction mixture is partitioned between water and chloroform and the chloroform extract dried over sodium sulfate, filtered and concentrated. The residue is purified by crystallization from 95% ethanol, ethyl acetate, or the like.

Representative for Steps A7 and A′7

The 2-oxazolidinones of Formula XII wherein the 3-position is substituted with hydrogen may also be prepared by reacting a selected compound of Formula XX, e.g., a 1-aryl-4-(1-carbamate-2-hydroxyalkyl)-piperazine, and urea, preferably but not necessarily in approximately equimolar quantities, at elevated temperatures, advantageously by heating the reactants together in the temperature range of 170° C. to 200° C., usually for periods as long as five hours for completion of the reaction, and separating the crude oxazolidinone. The pure oxazolidinone may be obtained by crystallization from an oxygenated solvent, e.g., ether, ethyl acetate, or the like. The carbamate starting material may in turn be prepared according to known procedure by reacting the selected 1-aryl-4-(1,2-dihydroxyalkyl)-piperazine or other Formula XVIII type compound with an equimolar quantity of phosgene in the cold to produce an intermediate chlorocarbonate compound, which is then reacted with ammonium hydroxide to yield the desired starting carbamate.

STEP B.—HALOGEN REPLACEMENT

The halogen of 5-(2-haloalkyl)-2-oxazolidinone compounds (Formula X) may be replaced by reaction of the selected starting compound of Formula X with any one of various reactants (XI) having a replaceable atom, e.g., hydrogen or an alkali metal, as already indicated previously.

Compounds of type (X) wherein X is halogen other than chlorine may also be prepared by allowing the chloro compound (X) to react with halide salts such as sodium iodide or bromide in an appreprate solvent such as acetone or methylethylketone.

To replace the halogen in a compound of Formula X with amines, the haloalkyl oxazolidinone X may be heated at reflux either with a large excess of appropriate amine or with a small excess of the amine in an appropriate solvent such as ethanol. The time required for these reactions usually ranges from about 3 to 18 hours. The solvent or excess amine may then be removed at reduced pressure and the residue partitioned between chloroform and dilute aqueous base. The chloroform solution may be dried over an appropriate drying agent such as sodium sulfate and the solvent removed at reduced pressure. Salts of the residual amine may then be prepared by dissolving the free base in an appropriate solvent such as alcohol and adding an acid such as anhydrous hydrochloric acid, maleic acid, or fumaric acid.

The compounds XII wherein Y equals cyano are best prepared by heating a solution of the appropriate salt such as sodium cyanide and the appropriate substituted 5-(2-haloalkyl)-2-oxazolidinone in a solvent such as dimethyl sulfoxide or dimethylformamide. After the solvent is removed from the reaction mixture at reduced pressure, the residual neutral products are usually washed with water and further purified either by distillation at reduced pressures or by crystallizing from a non-polar solvent.

In general, the 5-(omega-aminoalkyl)-2-oxazolidinone compounds are prepared by heating a solution of the selected 5-(omega-haloalkyl)-2-oxazolidinone and the selected amine in a suitable reaction solvent, e.g., ethanol, a higher boiling alcohol such as butanol, a hydrocarbon solvent such as toluene, or the amine itself may be the solvent in some cases. A reaction temperature from about room temperature to about 120° C. is usually employed, preferably 100 to 120° C., and a reaction period of about eight to twenty-four hours is usually adequate. Higher reaction temperatures increase the speed of reaction, while temperatures below 100° C. frequently require undesirably lengthy reaction periods. The amine may be employed in excess, or an inorganic base such as potassium carbonate can be used as a hydrogen acceptor. The resulting solution of the amine reaction product is concentrated, as in vacuo, and the amine product isolated, usually as the crystalline hydrohalide salt corresponding to the halogen in the starting omega-haloalkyl compound. In some cases the hydrohalide salt, e.g., the hydrochloride, crystallizes as the hydrate. In cases where a crystalline salt is difficult or impossible to obtain, the free basic amine itself may be distilled and crystallized from a solvent or solvent mixture or alternatively isolated as an oil by fractional distillation. Extraction of the reaction product with a suitable solvent, e.g., ether, benzene, toluene, or ethyl acetate, frequenly assists in recovering all of the available product for isolation by crystallization and aqueous acid, e.g., two normal HCl, or anhydrous ketones, e.g., methyl ethyl ketone, are frequently of value as the solvent or medium from which crystallization or recrystallization is effected. Where the free base is desired, this may be obtained conventionally by neutralizing the reaction product or a solution of the isolated salt with a base such as ammonia, ammonium hydroxide, sodium carbonate, or other suitable alkaline material, extracting the liberated base with a suitable solvent such as ethyl acetate or benzene, drying the extract and evaporating to dryness in vacuo or fractionally distilling, or in other conventional manner. Numerous acid addition salts may be prepared from the free bases, either isolated or without isolation from the reaction product. Compounds of Formula XII wherein Y is

Q or G are prepared generally in the foregoing manner. Reference should be made to the appropriate examples for further particulars and details.

The 5-(omega-cyanoalkyl)-2-oxazolidinones are prepared in conventional manner by reaction of the selected 5-haloalkyl-2-oxazolidinone with an alkali metal cyanide, e.g., sodium cyanide, usually by heating the reactants together in a suitable organic solvent, preferably dimethylformamide. This procedure can be applied equally well to the 5-(β-haloalkyl) compounds and the 5-(γ-haloalkyl) compounds, in each case to introduce the cyano group in place of the halogen atom, and thus to extend the 5-alkyl carbon chain. A representative example of this procedure is given in Examples 24 and 25.

The 5-(omega-carboxyalkyl)-2-oxazolidinones are prepared by conventional acid hydrolysis of the corresponding 5-(omega-cyanoalkyl)-2-oxazolidinones, employing a concentrated mineral acid reagent. A reaction period of 24 hours and a temperature not in excess of 100 degrees is usually adequate. Example 26 indicates the hydrolysis procedure employed.

The 5-(omega-carbalkoxyalkyl)-2-oxazolidinones are prepared from the 5-(omega-carboxyalkyl)-2-oxazolidinones by standard esterification procedure involving the acid and the selected alcohol in the presence of a suitable esterification catalyst, e.g., hydrogen chloride, sulphuric acid, cation exchange resins, or an aromatic sulphonic acid such as benzene or p-toluene sulfonic acid, preferably with removal of either the ester product or water of reaction if optimum yields are desired. Alternatively, the acid may be reacted with a diazoalkane, e.g., diazomethane, in excellent yield, or an alkyl halide may be reacted with an alkali metal salt of the acid, in usual manner. Moreover, the acid may first be converted to an acid halide as by treatment with thionyl chloride or bromide or phosphorus trichloride or tribromide, in the accepted manner for such type reactions, and the acid chloride then reacted with a selected alkanol or phenol or alkali metal salt thereof to give high yields of the desired ester. Example 27 is representative of the preparation of an acid halide of a 5-(omega-carboxyalkyl)-2-oxazolidinone, and is also indicative of the esterification of a 5-(omega-carboxyalkyl)-2-oxazolidinone via the acyl halide to produce a 5-(omega-carbalkoxyalkyl)-2-oxazolidinone.

Chain extension

It will be obvious that, in the event it is desired that the carbon chain at the 5 position of the oxazolidinone nucleus be greater than two carbon atoms, this is conveniently accomplished by starting with the appropriate two carbon atom side-chain omega-haloalkyl compound and preparing the omega-nitrile in accord with the foregoing disclosure and in particular accord with Examples 24 and 25. This nitrile may then be converted to the acid, also as shown in the foregoing and particularly in accord with Example 26, which in turn may be converted to the acid halide, as previously discussed and particularly in accord with Example 27, or converted to an ester as fully described hereinbefore and particularly illustrated by Example 26 or 27. Either the acid halide, e.g., chloride, or the ester may be converted to the corresponding omega-hydroxyalkyl compound by reduction, the ester with sodium and alcohol, or the acid halide with sodium borohydride, in accord with conventional procedure, as illustrated by Example 28. The 5-(omega-hydroxyalkyl) compound is then reacted with a suitable halogenating agent e.g., thionyl chloride, phosphorus trichloride, or the corresponding bromo reagents, to replace the hydroxy group by a halogen atom and produce the corresponding omega-haloalkyl compound. This in turn may be reacted with an alkali metal cyanide to again produce the nitrile, in each case having a side-chain containing one carbon atom more than the starting 5-(omega-haloalkyl)-2-oxazolidinone with which the reaction sequence originates, if desired.

STEP C.—DEBENZYLATION

This step involves the use of liquid ammonia and an alkali metal, e.g., sodium, and is conducted in conventional manner. The result is to split off a benzyl radical attached to the nitrogen atom of the oxazolidinone ring and replace it with a hydrogen atom. The reaction is applied to a compound of Formula XII, which includes within its scope the compounds of Formulas I, II, III, IV and V. The debenzylation is preferably applied to a compound of Formula I, II, IV or V.

The starting benzyl compound is preferably dissolved in a non-reactive organic solvent, usually a hydrocarbon solvent of benzenoid nature, although other non-reactive solvents are suitable. The alkali metal is usually used in at least equimolar quantities, preferably in excess, and the mole ratio is ordinarily at least about 2 of the metal to 1 of the starting benzyl compound. The ammonia is used in large excess. The starting benzyl compound in solution is usually added dropwise to the sodium in liquid ammonia. Thorough mixing is employed during the reaction. When addition is complete, the stirring is continued, ammonium chloride added, ammonia allowed to evaporate, and the reaction product extracted with dilute acid and worked up for product recovery in conventional manner, of which Example 10 is representative. Other replaceable groups can be employed and removed instead of the benzyl radical.

The following preparations and examples are given by way of illustration only and are not to be construed as limiting:

PREPARATION I.—5-(2-CHLOROETHYL)-3-METHYL-2-OXAZOLIDINONE AHR–1056

To 198 grams (2 moles) of phosgene, dissolved in 800 ml. of cold chloroform contained in a three liter, three-necked, round-bottomed flask equipped with a mechanical stirrer, dropping funnel, pot thermometer and condenser was added 204 grams (2 moles) of 1-methyl-3-pyrrolidinol in 450 ml. of chloroform. The reaction mixture was cooled in an ice bath and the addition was at such a rate that the pot temperature was kept below 10° C. After the addition of pyrrolidinol was completed, stirring was continued in cold for 0.75 hour. Then, with continued cooling and stirring, 270 ml. (2 mole) of triethylamine was added and the reaction mixture allowed to warm to room temperature. The chloroform solution was extracted with dilute HCl, then dilute NaOH and finally water. The chloroform layer was dried over sodium sulfate. The chloroform was removed at reduced pressure on a rotary evaporator. Weight of the neutral residual oil was 238 grams. This product was distilled in vacuo (0.3 to 0.6 mm.). (During the distillation there was evidence of some decomposition.) After a small forerun, 200 grams (60% yield) of distillate (B.P. 120–135° C.) which contained a small amount of crystalline solid was collected, which was redistilled using a 6-inch heated column. The product (I) boiled at 120° C. at 0.2 mm., wt. 169 grams (52% yield).

*Analysis.*—Calcd. for $C_6H_{10}NO_2Cl$: C, 44.04; H, 6.16; N, 8.56. Found: C, 44.59; H, 6.31; N, 8.41.

Preparations II through VII are carried out in the same manner as Preparation I. The corresponding 2-bromoethyl compounds are prepared using carbonyl dibromide. Table I indicates the structure and other pertinent information for these preparations.

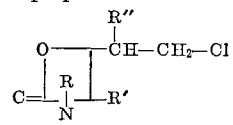

TABLE I

| Preparation No. | AHR No. | R | R' | R'' | M.P., °C. | B.P., °C. | Pressure, mm. |
|---|---|---|---|---|---|---|---|
| II | 1045 | —$C_2H_5$ | H | H |  | 120–122 | 0.2 |
| III | 1205 | -n-$C_4H_9$ | H | H |  | 134–141 | 0.2 |
| IV | 1158 | Cyclohexyl | H | H | 56–59 |  |  |
| V | 1060 | Benzyl | H | H | 51–52 |  |  |
| VI | 1206 | —$CH_3$ | —$CH_3$ | H |  | 125–130 | 1.5 |
| VII | 1207 | —$CH_3$ | H | —$CH_3$ |  | 112–122 | 0.1 |

Analytical Data

| Preparation No. | Calculated for | | | Found | | |
|---|---|---|---|---|---|---|
|  | C | H | N | C | H | N |
| II | 47.33 | 6.81 | 7.88 | 47.31 | 6.92 | 7.73 |
| III |  | 6.81 |  |  |  | 6.82 |
| IV | 57.01 | 7.83 | 6.04 | 57.18 | 7.84 | 6.16 |
| V | 60.12 | 5.89 | 5.84 | 60.11 | 5.76 | 5.87 |
| VI |  |  | 7.89 |  |  | 7.94 |
| VII |  |  | 7.89 |  |  | 7.87 |

PREPARATION VIII.—3-BENZYL-5-(2-IODO-ETHYL)-2-OXAZOLIDINONE AHR-1208

A solution of 12.0 grams (0.05 mole) of 3-benzyl-5-(2-chloroethyl)-2-oxazolidinone (Preparation VI) and 10.5 grams (0.07 mole) of sodium iodide in 100 ml. of acetone was heated at gentle reflux with mechanical stirring for 20 hours. The reaction mixture was cooled and a white precipitate was separated by filtration and washed with acetone. The precipitate weighed 2.8 grams (95.5% of theoretical yield of sodium chloride). The combined filtrate and acetone wash were concentrated on a rotary evaporator. A brown oil remained, weight 16.8 grams. The oil was repeatedly extracted with hot isopropyl ether leaving a dark insoluble residue. The isopropyl ether solution deposited on cooling a slightly colored solid which on recrystallization from isopropyl ether yielded 5.0 grams of a white crystalline solid, M. P. 42–43° C. Also, 3.5 grams of a slightly discolored solid was recovered, M.P. 42–43° C. Yield 51.5%.

*Analysis.*—Calcd. for $C_{12}H_{14}NO_2I$: N, 4.23. Found: N, 4.44.

In the same manner, the corresponding bromo compound is prepared, using sodium bromide instead of sodium iodide.

PREPARATION IX.—3-BENZYL-5-(2-CHLORO-ETHYL)-4,4-DIMETHYL-2-OXAZOLIDINONE 1-benzyl-2,2-dimethyl-3-pyrrolidinol [prepared according to the method of Ryan, C.W., et al., J. Org. Chem. 27, 2901–5 (1962) but using benzylamine rather than methylamine] is reacted with phosgene as described for Preparation I to produce the above-identified compound.

PREPARATION X

Other chloroethyl compounds prepared by the same method as above are shown below and the pyrrolidinols from which they are derived are indicated. These pyrrolidinols are also prepared by the method of Ryan et al.

3-benzyl-5-(1-chloro-2-propyl)-2-oxazolidinone is produced from 1-benzyl-4-methyl-3-pyrrolidinol and phosgene.

3-benzyl - 5 - (2-chloroethyl)-4-methyl-2-oxazolidinone is produced from 1-benzyl-2-methyl-3-pyrrolidinol and phosgene.

3-benzyl-5-(2-chloropropyl)-2-oxazolidinone is produced from 1-benzyl-2-methyl-4-pyrrolidinol and phosgene.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, other molecular changes are readily made.

EXAMPLES

Formula I type compounds, (a) R=other than hydrogen

Example 1: 3-cyclohexyl-5-[2-(4-phenylpiperazino)-ethyl]-2-oxazolidinone hydrochloride AHR–1210.—A solution of 11.5 grams (0.05 mole) of 5-(2-chloroethyl)-3-cyclohexyl-2-oxazolidinone and 16.0 grams (0.10 mole) of 4-phenyl-piperazine in 100 ml. of ethanol (95%) was heated at reflux for 8 hours. The dark solution was dehydrated by distilling with benzene on a rotary evaporator. On cooling, a white precipitate formed which was separated by filtration and dried in air. Yield: 4 grams; M.P. 235–238° C. (This product was the hydrochloride of the starting amine.) The filtrate was concentrated on a rotary evaporator to remove the ethanol. The residue was suspended in water and made alkaline with dilute sodium hydroxide. A viscous brown oil precipitated. The supernatant was decanted and the oil washed several times with water and finally dissolved in ethanol and dried by distilling with benzene on the rotary evaporator. The volume was brought to 100 ml. with absolute ethanol. The solution was made acid with ethereal HCl. The white solid precipitate was separated by filtration and washed with ethanol and with isopropyl ether. Yield: 12.4 grams; M.P. 270–280° C. (with decomp.). Recrystallized the product from an ethanol-water mixture, yield: 10.1 grams (51.5%), M.P. 276–279° C. (with decomp.).

*Analysis.*—Calcd. for $C_{21}H_{32}ClN_3O_2$: N, 10.68. Found: N, 10.78.

Example 2: 3-benzyl-5-[2-(4-phenylpiperazino)ethyl]-2-oxazolidinone hydrochloride AHR–1126.—The procedure of Example 1 was employed. The quantities of reactants were:

3-benzyl-5-(2 - chloroethyl)-2-oxazolidinone—24.0 grams (0.1 mole)
1-phenyl-piperazine—17.8 grams (0.11 mole)
Ethanol (absolute) 100 ml. (solvent)

The product was recrystallized from water and finally from ethanol. Yield: 5.4 grams (27%), M.P. 228–230° C. (with decomp.).

*Analysis.*—Calcd. for $C_{22}H_{28}ClN_3O_2$: C, 65.74; H, 7.02; N, 10.46. Found: C, 65.57; H, 7.17; N, 10.38.

Example 2a: 3-benzyl-5-[2-(4-o-tolylpiperazino)ethyl]-2-oxazolidinone.—The procedure of Example 1 was employed to prepare this compound but using 3-benzyl-5-(2-chloroethyl)-2-oxazolidinone (Preparation V) and 1-o-tolylpiperazine. The base was isolated as an oil and used as such to prepare the debenzylated compound.

Example 2b: 3-benzyl-5-[2-(4-p-tolylpiperazino)ethyl]-2-oxazolidinone.—The procedure of Example 1 was employed to prepare this compound but using 3-benzyl-5-(2-chloroethyl)-2-oxazolidinone (Preparation V) and 1-p-tolylpiperazine. The base was isolated as an oil and used as such to prepare the debenzylated compound.

Example 2c: 3 - benzyl-5-{2-[4-(2-methoxyphenyl)-piperazino]ethyl}-2-oxazolidinone.—The procedure of Example 1 was employed to prepare this compound but using 3-benzyl-5-(2-chloroethyl)-2-oxazolidinone (Preparation V) and 1-(o-methoxyphenyl)piperazine. The base was isolated as an oil and used as such to prepare the debenzylated compound.

Example 2d.—Other compounds prepared by the same procedure are 3 - benzyl-{2-[4-(3-methoxyphenyl)piperazino]ethyl}-2-oxazolidinone, and 3 - benzyl - {2-[4-(4-methoxyphenyl)piperazino]ethyl}-2-oxazolidinone.

Example 3: 3-benzyl-4,4-dimethyl-5-[2-(4-phenylpiperazino)ethyl] - 2 - oxazolidinone.—This compound is prepared by the reaction of 3-benzyl-5-(2-chloroethyl)-4,4-dimethyl-2-oxazolidinone with 1-phenylpiperazine in the manner of Example 1.

Example 4.—Starting with the appropriate 3-benzyl-5-chloroalkyl-2-oxazolidinones, the following compounds are prepared in the manner of Example 3 or 1.

3 - benzyl-5-[1-(4-phenylpiperazino)-2-propyl]-2-oxazolidinone is prepared from 1-phenylpiperazine and 3-benzyl-5-(1-chloro-2-propyl)-2-oxazolidinone.

3 - benzyl - 4 - methyl-5-[2-(4-phenylpiperazino)ethyl]-2-oxazolidinone is prepared from 1-phenylpiperazine and 3-benzyl-4-methyl-5-(2-chloroethyl)-2-oxazolidinone.

3 - benzyl - 5 - [2-(4-phenylpiperazino)propyl]-2-oxazolidinone is prepared from 1-phenylpiperazine and 3-benzyl-5-(2-chloropropyl)-2-oxazolidinone.

Example 5: 3 - benzyl-5-{2-[4-(2-pyridyl)piperazino]-ethyl}-2-oxazolidinone.—This compound is prepared by reacting 3-benzyl-5-(2-chloroethyl)-2-oxazolidinone with 1-(2-pyridyl)piperazine in the manner of Example 1.

Example 6.—Other compounds which are prepared in the manner of Example 1 using the appropriate cyclic amines are 3-benzyl - 5 - {2-[4-(2-quinolyl)piperazino]- ethyl}-2-oxazolidinone from 3-benzyl-5-(2-chloroethyl)-2-oxazolidinone and 1-(2-quinolyl)piperazine; 3-benyl-5-[2 - (2-methyl-4-phenylpiperazino)ethyl]-2-oxazolidinone from 3-benzyl-5-(2-chloroethyl)-2-oxazolidinone and 2-methyl-1-phenylpiperazine; and 3-benzyl-5-[2-(4-phenyl-homopiperazino)ethyl]-2-oxazolidinone from 3-benzyl-5-(2-chloroethyl)-2-oxazolidinone and 1-phenylhomopiperazine.

Example 7: 5 - [2-(4-phenylpiperazino)-ethyl]-2-oxazolidinone maleate AHR–1209B.—A 0.195 mole run was carried out by adding an equimolar quantity of maleic acid in acetone to AHR–1209 dissolved in isopropanol. The warmed solution was treated with Norite A (activated charcoal) and gravity filtered. Upon cooling the filtrate 0.143 mole of product was collected.

This crystalline material was dissolved in 95% ethanol and taken to cloudiness with isopropyl ether. The solution was cooled and 50 grams of white crystalline water-soluble material was collected. Yield: 70.5%; M.P. 141–143° C. M.W. 391.40 (70.5% base).

*Analysis.*—Calcd. for $C_{19}H_{25}N_3O_6$: C, 58.30; H, 6.44; N, 10.74. Found: C, 58.74; H, 6.52; N, 10.65.

Example 8: 3-methyl-5-[2-(4-phenylpiperazino)-ethyl]-2-oxazolidinone maleate AHR–1404.—The base was prepared by adding to a 100 ml. volume of dry toluene 22 grams (0.08 mole) of 5-[2-(4-phenylpiperazino)-ethyl]-2-oxazolidinone and 3.31 grams (0.085 mole) of sodium amide and brought to reflux with stirring. The reaction was maintained at reflux until no more ammonia was evolved (approximately 4 hours). The reaction was then cooled to −5° C. and 5.44 grams (0.43 mole) of dimethylsulfate was added. The reaction was then stirred for several hours at room temperature and brought to reflux for 1 hour. After cooling to 15° C. and washing first with approximately 50 ml. of water and then extracting with a sufficient quantity of dilute hydrochloric acid, the acid layer was separated and basified, in the cold, with 25% sodium hydroxide and extracted with chloroform. The chloroform portion was dried over sodium sulfate and concentrated giving 16 grams of amber oil. (0.0554 mole) 69.4%.

The salt formation was the same as in Example 7 with these exceptions. The initial formation was carried out using a methyl ethyl ketone and methanol system. Subsequent crystallizations were from isopropanol. The product was slightly tan, water-soluble, and had a M.W. of 405.44 (71% base). Yield. 34%; M.P. 151–153.5° C.

*Analysis.*—Calcd. for $C_{20}H_{27}N_3O_6$: C, 59.24; H, 6.71; N, 10.36. Found: C, 59.40; H, 6.68; N, 10.16.

Example 9: 3-ethyl-5-[2-(4-phenylpiperazino)-ethyl]-oxazolidinone maleate AHR–1439.—1-phenylpiperazine (15 grams; 0.924 mole), 8.2 grams (0.046 mole) of 3-ethyl-5-(2-chloroethyl)-oxazolidinone and 50 ml. of isopropanol was stirred and refluxed 3.0 hours. The hot reaction mixture was filtered; the cooled filtrate (10° C.) was treated with 15 ml. of 50% caustic, followed by 50 grams of ice and transferred to a separatory funnel. The upper layer after concentration to one-half its original volume was poured into 10 volumes of isopropyl ether and the oil which separated crystallized on trituration with fresh isopropyl ether. Yield 5.0 grams (35.7%), M.P. 82–85° C.

The free base (3.83 grams; 0.013 mole) in 50 ml. of isopropanol was treated with 1.47 grams (0.013 mole) of maleic acid and after standing 2.0 hours at room temperature the mixture was filtered to give, after drying, 4.8 grams (90.5%) of the maleate salt, M.P. 157–159° C. The salt was recrystallized from a minimum amount of boiling methanol; melting point of recrystallized maleate, M.P. 160–162° C. The colorless solid was water-soluble and had a M.W. of 419.466 (72% free base).

*Analysis.*—Calcd. for $C_{21}H_{29}N_3O_6$: N, 10.02. Found: N, 10.26.

Formula I type compounds, (b) R=hydrogen

Example 10: 5-[2-(4-phenylpiperazino)-ethyl]-2-oxazolidinone AHR–1209.—Sodium (1.7 grams; 0.075 mole) is dissolved in aproximately 75 ml. of liquid ammonia. To this deep blue colored solution was added dropwise 14.7 grams (0.04 mole) of 3-benzyl-5-[2-(4-phenylpiperazino)ethyl]-2-oxazolidinone in 100 ml. of toluene. When approximately 80% of the toluene solution had been added the blue color disappeared. An additional 0.2 gram of sodium was added to the reaction mixture and the addition of the toluene solution was continued. Before all of this solution had been added, a solid formed in the reaction flask and thorough mixing became difficult. After the addition was complete, stirring was continued for one hour and 5.4 grams (0.1 mole) of ammonium chloride was then added. With continued stirring the ammonia was allowed to evaporate. The reaction mixture was then extracted with dilute HCl. To this aqueous extract was carefully added aqueous ammonium hydroxide with stirring. The first precipitate was a brownish gummy oil from which the supernatant liquid was decanted. Continued addition of ammonium hydroxide to the supernatant yielded a crystalline solid which was separated by filtration, washed with water and dried in vacuo. Yield: 6.8 grams, M.P. 135–140° C. After two recrystallizations from isopropyl alcohol, 2.8 grams (23.8% yield) of a white crystalline solid was obtained, M.P. 151–152° C.

*Analysis.*—Calcd. for $C_{15}H_{21}N_3O_2$: C, 65.43; H, 7.69; N, 15.26. Found: C, 65.38; H, 7.62; N, 15.35.

Example 11: 5-[2-(4-phenylpiperazino)-ethyl]-2-oxazolidinone maleate AHR–1209B.—A 0.195 mole run was carried out by adding an equimolar quantity of maleic acid in acetone to AHR–1209 dissolved in isopropanol. The warmed solution was treated with Norite A (activated charcoal) and gravity filtered. Upon cooling the filtrate 0.143 mole of product was collected.

This crystalline material was dissolved in 95% ethanol and taken to cloudiness with isopropyl ether. The solution was cooled and 50 grams of white crystalline water-soluble material was collected. Yield: 70.5%; M.P. 141–143° C.; M.W. 391.40 (70.5% base).

*Analysis.*—Calcd. for $C_{19}H_{25}N_3O_6$: C, 58.30; H, 6.44; N, 10.74. Found: C, 58.74; H, 6.52; N, 10.65.

Example 12: 5-[2-(4-o-tolylpiperazino)-ethyl]-2-oxazolidinone maleate AHR–1443.—The base was formed in the same manner as given in Example 10, using the corresponding benzyl compound (Example 2a).

The final salt product was formed by combining 31 grams (0.107 mole) of 5-[2-(4-o-tolylpiperazino)-ethyl]-2-oxazolidinone dissolved in isopropanol with 12.4 grams (0.107 mole) of maleic acid dissolved in a minimal amount of methanol. A white crystalline product formed on standing and after several recrystallizations from a methanol-ethanol mixture, 26.2 grams of slightly water-soluble material with a M.P. 182–185° C. was obtained. Yield: 25.3%. The molecular weight was 405.44 (71.5% base).

*Analysis.*—Calcd. for $C_{20}H_{27}N_3O_6$: C, 59.24; H, 6.71; N, 10.36. Found: C, 59.56; H, 6.75; N, 10.97.

Example 13: 5-[2-(4-p-tolylpiperazino)-ethyl]-2-oxazolidinone maleate AHR–1444.—A 0.35 mole run was made in an identical manner to that given for Example 10, employing the corresponding benzyl compound (Example 2b).

The maleate salt was obtained by combining 33 grams (0.114 mole) of the base in isopropanol with 13.4 grams (0.115 mole) of maleic acid in a minimal amount of methanol. On standing overnight a crystalline product was obtained. This material was recrystallized from an isopropanol-methanol system giving 43 grams of white crystalline substance, which was slightly soluble in water. Yield 30%; M.P. 144–145.5° C.; M.W. 405.44 (71.5% base).

*Analysis.*—Calcd. for $C_{20}H_{27}N_3O_6$: C, 59.24; H, 6.71; N, 10.36. Found: C, 59.65; H, 6.81; N, 10.36.

Example 13a: 5-{2-[4-(2-methoxyphenyl)piperazino] ethyl}-2-oxazolidinone maleate AHR–1464.—The base of the above compound was prepared in the same manner as that given for Example 10, employing the corresponding benzyl compound (Example 2c). The maleate salt was prepared as described for Example 13 but was recrystallized from ethanol (95%). Yield 33%, M.P. 179.5–182.5° C.

*Analysis.*—Calcd. for $C_{20}H_{27}N_3O_7$: C, 57.00; H, 6.46; N, 9.97. Found: C, 57.35; H, 6.60; N, 10.26.

Example 13b.—Other compounds prepared in the same manner using the appropriately substituted 1-phenylpiperazines are: 5-{2-[4-(3-methoxyphenyl)piperazino]ethyl}-2-oxazolidinone; and 5-{2-[4-(4-methoxyphenyl)piperazino]ethyl}-2-oxazolidinone.

Example 14: 5 - {2 - [4-(2-chlorophenyl)-piperazino]-ethyl}-2-oxazolidinone.—One mole of 1-(2-chlorophenyl) piperazine is added to an isopropanol solution of 0.5 mole of 5-(2-chloroethyl)-2-oxazolidinone prepared by reacting 4-chloro-1,2-epoxybutane with urethane using lithium amide catalyst. The reaction is refluxed for 18 hours, cooled to 15° C., and 0.5 mole of 25% sodium hydroxide added. The reaction mixture is then concentrated at reduced pressure (approx. 100 mm. Hg) and 80° C. The residue is dissolved in isopropanol and an equimolar quantity of maleic acid is added. The resulting crystals are crystallized several times to give the desired product.

Example 15.—Other compounds prepared in the same manner using the appropriately substituted 1-phenylpiperazines are:

5 - {2 - [4 - (3 - trifluoromethylphenyl) - piperazino]-ethyl}-2-oxazolidinone from 1-(3-trifluoromethylphenyl)-piperazine and 5-(2-chloroethyl)-2-oxazolidinone.

5 - {2 - [4 - (4 - fluorophenyl) - piperazino] - ethyl}-2-oxazolidinone from 1-(4-fluorophenyl)-piperazine and 5-(2-chloroethyl)-2-oxazolidinone.

5 - {2 - [4 - (2 - methoxyphenyl) - piperazino] - ethyl}-2 - oxazolidinone from 1 - (2-methoxyphenyl)-piperazine and 5-(2-chloroethyl)-2-oxazolidinone.

5 - {2 - [4 - (3 - methoxyphenyl) - piperazino]-ethyl}-2 - oxazolidinone from 1-(3-methoxyphenyl)-piperazine and 5-(2-chloroethyl)-2-oxazolidinone.

5 - {2 - [4 - (4 - methoxyphenyl - piperazino] - ethyl}-2 - oxazolidinone from 1-(4-methoxyphenyl) - piperazine and 5-(2-chloroethyl)-2-oxazolidinone.

Example 16: 5-{2-[4-(2-pyridyl)-piperazino]-ethyl}-2-oxazolidinone.—3 - benzyl - 5 - {2 - [4 - (2 - pyridyl)-piperazino]-ethyl}-2-oxazolidinone is debenzylated according to the procedure described in Example 10 to give the above-identified compound.

Example 17.—Other compounds which are prepared in the same manner using in each case the corresponding 3-benzyl-2-oxazolidinone are: 5-{2-[4-(2-quinolyl)-piperazino] - ethyl} - 2 - oxazolidinone; 5 - [2 - (2 - methyl - 4 - phenylpiperazino)-ethyl]-2-oxazolidinone; and 5 - [2-(4-phenylhomopiperazino)-ethyl]-2-oxazolidinone.

Example 18: 4,4 - dimethyl - 5 - [2 - (4 - phenylpiperazino) - ethyl] - 2 - oxazolidinone.—3 - benzyl - 4,4 - dimethyl - 5 - [2 - (4 - phenylpiperazino) - ethyl] - 2 - oxazolidinone is debenzylated by the procedure described in Example 10 to produce the above-identified compound.

Example 19.—Other compounds prepared in the same manner by substituting in each case the corresponding 3-benzyl compound are: 5-[1-(4-phenylpiperazino)-2-propyl] - 2 - oxazolidinone; 4-methyl - 5 - [2 - (4 - phenylpiperazino)-ethyl]-2-oxazolidinone; and 5-[2-(4-phenylpiperazino)-propyl]-2-oxazolidinone. Additional Type (I) compounds prepared in the same manner from the appropriate selected starting materials include:

TYPE I 3-ethyl-5-{2-[4-(2-methylthiophenyl)-piperazino]-ethyl}-ethyl}-2-oxazolidinone 5-{2-[4-(3-dimethylaminophenyl)-piperazino]ethyl}-3-methyl-2-oxazolidinone 3-methyl-5-{2-[4-(3-nitrophenyl)-piperazino]ethyl}-2-oxazolidinone 3-ethyl-5-{2-[4-(2-methylthiophenyl)-piperazino]-ethyl}-2-oxazolidinone Formula II type compounds, (—CHR″—bridge at 5)

Example 20: 5 - (4 - phenylpiperazinomethyl) - 2-oxazolidinone maleate AHR–1421.—One-tenth (0.1) mole of 5-chloromethyl-2-oxazolidinone [prepared according to the method of Katchalski, E., et al., J. Org. Chem. 15, 1071 (1950)] and 0.22 mole of 1-phenylpiperazine were reacted in isopropanol in the same manner as given in Example 14.

The maleate salt was formed in isopropanol and recrystallized from the same solvent. It was a colorless crystalline solid, soluble in water and methanol, M.P. 166–168° C., M.W. 377.368 (69.25% free base).

*Analysis.*—Calcd. for $C_{18}H_{23}N_3O_6$: N, 11.14. Found: N, 10.99.

Example 21: 5 - (4 - meta - trifluoromethylphenyl-piperazinomethyl) - 2 - oxazolidinone maleate AHR–1422.—This compound was prepared by the procedure of Example 20 but using 1-meta-trifluoromethylphenyl-piperazine rather than 1-phenylpiperazine; colorless crystalline solid, soluble in water and methanol, M.P. 122–124° C., N.W. 445.388 (73.94% free base).

*Analysis.*—Calcd. for $C_{19}H_{22}F_3N_3O_6$: N, 9.44. Found: N, 9.40.

Example 22: 5-[4-(4-chlorophenyl)piperazino]-methyl-2-oxazolidinone.—A mixture of urea and 1-(4-chlorophenyl)-4-(2,3-dihydroxypropyl)piperazine (prepared according to Morren, H., U.S. Patent 3,163,649, Dec. 29, 1964) in 1:2 molar ratio is rapidly heated to 180–190° C. and maintained at this temperature for 4 hours. The crude mixture is washed with water and the insoluble desired product is purified by recrystallizing from alcohol.

Example 23.—According to the method of the foregoing example, the following compounds are prepared from the corresponding glycol and urea:

5-[4-(2,5-dimethoxyphenyl)-piperazino]-methyl-2-oxazolidinone;

5-[4-(2,4-dimethylphenyl)-piperazino]-methyl-2-oxazolidinone;

5-[4-(4-methylphenyl)-piperazino]-methyl-2-oxazolidinone;

5-[4-(2-methylphenyl)-piperazino]-methyl-2-oxazolidinone;

5-[4-(2-methoxyphenyl)-piperazino]-methyl-2-oxazolidinone;

5-[4-(4-methoxyphenyl)-piperazino]-methyl-2-oxazolidinone;

5-[4-(3-chlorophenyl)-piperazino]-methyl-2-oxazolidinone;

and numerous additional compounds of the same type.

Additional Type II compounds prepared in the same manner from the appropriate selected starting materials include:

TYPE II 3-methyl-5-[4-(4-methylthiophenyl)piperazinomethyl]-2-oxazolidinone

5-[4-(3-diethylaminophenyl)piperazinomethyl]-3-methyl-2-oxazolidinone 3-methyl-5-[4-(3-nitrophenyl)piperazinomethyl]-2-oxazolidinone Formula III type compounds Example 24: 5-(2-cyanoethyl)-3-methyl-2-oxazolidinone AHR–1214.—A mixture of 8.2 grams (0.05 mole) of 5-(2-chloroethyl)-3-methyl-2-oxazolidinone and 3.8 grams (0.075 mole) of sodium cyanide in 50 ml. of dimethyl sulfoxide was heated on a steam bath overnight. The reaction mixture was filtered to remove the insoluble, inorganic salts and most of the dimethyl sulfoxide was distilled at reduced pressure. The residue was dissolved in approximately 60 ml. of water and the solution was extracted with chloroform. The chloroform solution was dried with sodium sulfate and the solvent removed on a rotary evaporator. The weight of the residual oil was 7.6 grams (99% yield). This oil was distilled in vacuo and 4.2 grams of slightly yellow oil, B.P. 165–175° C. at 0.2–0.4 mm. was collected. The oil crystallized on standing for several days exposed to air and was recrystallized from a mixture of isopropyl alcohol and isopropyl ether. Yield: 2.8 grams (36.5%); M.P. 44–45° C.

*Analysis.*—Calc. for $C_7H_{10}N_2O_2$: N, 18.18. Found: N, 18.13.

The corresponding 2-acetoxyethyl compound is prepared by substituting a selected alkali metal acetate for the sodium cyanide. Other 2-alkanoyloxyethyl compounds are prepared in the same manner from selected alkali metal alkanoates.

Example 25: 3-benzyl - 5 - (2-cyanoethyl)-2-oxazolidinone.—3 - benzyl - 5 - (2-chloroethyl)-2-oxazolidinone is reacted with sodium cyanide in the same manner as described for the preparation of AHR–1214 (Example 24) to produce the above-identified compound.

The corresponding 2-acetoxyethyl compound is prepared by substituting a selected alkali metal acetate for the sodium cyanide. Other 2-alkanoyloxyethyl compounds are prepared in the same manner from selected alkali metal alkanoates.

Example 26: 3-benzyl-2-oxazolidinone-5-propionic acid and alkyl esters thereof.—A mixture of 3-benzyl-5-(2-cyanoethyl)2-oxazolidinone and a large excess of 70% sulfuric acid is stirred and heated at 80–90° for 24 hours and poured into ice and water. The precipate is separated and crystallized from an appropriate solvent and found to be the desired compound. This compound is converted to lower-alkyl esters thereof by standard esterification procedure using an acid catalyst and selected lower-alkanol.

Example 27: 3 - benzyl - 2 - oxazolidinone-5-propionyl chloride.—A suspension of 3-benzyl-2-oxazolidinone-5-propionic acid in benzene is treated dropwise with approximately 2 molar equivalents of thionyl chloride with stirring. The resulting solution is heated for 1 hour at reflux and concentrated in vacuo. The residue is purified by crystallization from a nonpolar solvent or otherwise worked up to yield the desired compound. The acid bromide is prepared in the same manner using thionyl bromide. Lower-alkyl esters are prepared from the acid chloride or bromide using the selected lower alkanol or alkali metal alcoholate.

Example 28: 3 - benzyl - 5 - (3-hydroxypropyl)-2-oxazolidinone.—To a suspension of sodium borohydride in dry dioxane is rapidly added with stirring a solution of 3-benzyl-2-oxazolidinone-5-propionyl chloride or bromide in dry dioxane. The resulting mixture is stirred at reflux for 4 hours, cooled to room temperature and water is carefully added. The mixture is then partitioned between water and chloroform. The chloroform solution is dried with anhydrous sodium sulfate and concentrated in vacuo. The residue may be purified by crystallizing from an appropriate solvent to yield the above-identified compound.

Example 29: 3 - benzyl-5-(3-chloropropyl)-2-oxazolidinone.—A solution of 2 parts of thionyl chloride in chloroform is added dropwise to a solution of 1 part of 3 - benzyl - 5 - (3-hydroxypropyl)-2-oxazolidinone and two parts of pyridine in chloroform with stirring and ice bath cooling. When the addition is complete, the mixture is heated at reflux for 5 hours, and then cooled in an ice bath. Water is added with stirring and then dilute hydrochloric acid is added until the mixture is acid. The chloroform layer is separated, dried with anhydrous sodium sulfate and concentrated in vacuo. The residue is crystallized in isopropyl ether and identified as the desired compound.

Example 30: 3-benzyl-5-[3-(4-phenylpiperazino)-propyl]-2-oxazolidinone.—3 - benzyl - 5-(3-chloropropyl)-2-oxazolidinone is reacted with 1-phenylpiperazine in the same manner as described for the preparation of AHR–1210 (Example 1) to produce the above-identified compound.

Example 31: 5 - [3-(4 - phenylpiperazino) - propyl]-2-oxazolidinone.—3 - benzyl-5-[3-(4-phenylpiperazino)propyl]-2-oxazolidinone is debenzylated in the same manner as described for the preparation of AHR–1209 (Example 10) to yield the desired compound.

Formula IV and V type compounds

Example 32: 3-benzyl-5-[2 - (3 - methylanilinopyrrolidino)-ethyl]-2-oxazolidinone and its dihydrochloride.—

A mixture of 15 g. (0.0625 mole) of 3-benzyl-5-(2-chloroethyl)-2-oxazolidinone, 11.5 g. (0.065 mole) of 3-methylanilinopyrrolidine and 8.7 g. (0.063 mole) of potassium carbonate in 150 ml. of isopropanol was refluxed under nitrogen for 40 hours. The suspended salt was removed by filtration and the filtrate was evaporated under reduced pressure to an oil; yield 24 g. Most of this material was not purified further, however, 4 g. of the oil was dissolved in acetone and treated with ethereal HCl. The resulting salt was recrystallized from acetone-methanol and yielded 1 g. of the dihydrochloride melting at 179–182°.

*Analysis.*—Calcd. for $C_{23}H_{31}N_3O_2Cl_2$: C, 61.06; H, 6.91; N, 9.29. Found: C, 61.42; H, 6.80; N, 9.30.

Other N-lower-alkylanilino compounds and compounds in which the phenyl radical of the anilino radical is a substituted phenyl group, as herein defined, are prepared in identical manner starting from the correspondingly-substituted pyrrolidine starting material. The corresponding 3 and 4 substituted piperidino compounds are prepared in the same manner from the correspondingly substituted methylanilinopiperidines.

Example 33: 3-benzyl-5-{2-[N-methyl-N-(1-phenyl-3-pyrrolidinyl) - amino]ethyl}-2-oxazolidinone.—This compound is prepared by reacting 3-benzyl-5-(2-chloroethyl)-2-oxazolidinone (AHR–1060, Preparation V) with N-methyl-N-(1-phenyl-3-pyrrolidinyl)-amine in the same manner as given in Example 1 for the preparation of AHR–1210. Other N-lower-alkyl compounds and compounds wherein the phenyl group is a substituted phenyl group, as herein defined, are prepared in identical manner starting from the correspondingly-substituted pyrrolidinylamine.

Likewise, the corresponding 3 and 4 piperidinyl compounds are prepared from the appropriate starting piperidinyl amine.

Example 34: 3-benzyl-5-[2-(4-ethylcarboxylate-4-phenylpiperidino)-ethyl]-2-oxazolidinone.—This compound is prepared by reacting 4-ethylcarboxylate-4-phenylpiperidine with 3-benzyl-5-(2 - chloroethyl) - 2 - oxazolidinone (AHR–1060, Preparation V) in the same manner as given for the preparation of AHR–1210 in Example1. Other 4-lower-alkylcarboxylate compounds and 4-substituted phenyl (as herein defined) compounds are prepared in identical manner starting from the correspondingly-substituted piperidine starting material. In the same manner the corresponding 3-substituted piperidino and pyrrolidino compounds are prepared from the appropriate 3-substituted piperidine or pyrrolidine starting compound.

Example 35: 5-[2-(3-methylanilinopyrrolidino)-ethyl]-2-oxazolidinone.—This compound is produced by debenzylating the compound of Example 32, 3-benzyl-5-[2-(3-methylanilinopyrrolidino)ethyl]-2-oxazolidinone, with sodium and liquid ammonia according to the procedure of Example 10. Other N-lower-alkylanilino compounds and compounds wherein the anilino phenyl radical is a substituted phenyl radical, as herein defined, are prepared in identical manner starting from the corresponding 3-benzyl starting material. The corresponding 3 and 4-substituted piperidino compounds are prepared in the same manner from the appropriate benzyl starting materials.

Example 36: 5-{2-[N-methyl - N - (1 - phenyl - 3 - pyrrolidinyl)-amino]ethyl}-2-oxazolidinone.—This compound is produced from the compound of Example 33, 3-benzyl-5-{2-[N-methyl-N-(1-phenyl-3-pyrrolidinyl)amino]ethyl}-2-oxazolidinone, by debenzylation thereof in the manner of Example 10 using sodium and liquid ammonia. Other N-lower-alkyl compounds and compounds wherein the phenyl group is a substituted phenyl group, as herein defined, are prepared in identical manner starting from the corrrespondingly substituted 3-benzyl compound. The corresponding 3 and 4-substituted piperidinyl compounds are produced in the same manner from the corresponding benzyl starting materials.

Example 37: 5-[2-(4-carboxy-4-phenylpiperidino)ethyl]-2-oxazolidinone and ethyl ester.—3-benzyl-5-[2-(4-carboxy-4-phenylpiperidino)ethyl]-2-oxazolidinone is prepared from the corresponding ethyl ester (Example 34) by hydrolysis with aqueous hydrochloric acid. This carboxylic acid is then debenzylated in the manner of Example 10 to produce the title carboxylic acid. 5-[2-(4-ethyl carboxylate 4-phenylpiperidino)ethyl]-2-oxazolidinone is prepared from the title acid by conventional methods, i.e., refluxing the acid in an excess of ethanol with catalytic amounts of a mineral acid.

Other lower-alkylcarboxylates and 4-substituted phenyl compounds, as "substituted phenyl" is herein defined, are prepared in identical manner starting from the correspondingly-substituted 3-benzyl compound. The corresponding 3-substituted piperidino and pyrrolidino compounds are produced in the same manner from the corresponding benzyl starting materials.

Example 38: 3-benzyl-5-[2-(4-propionoxy-4-phenylpiperidino)-ethyl]-2-oxazolidinone fumarate.—A stirred mixture of 5 g. (0.013 mole) of 3-benzyl-5[2-(4-hydroxy-4-phenylpiperidino)-ethyl]-2-oxazolidinone and 4 g. (0.029 mole) of potassium carbonate in 50 ml. of chloroform was treated all at once with 1.22 g. (0.013 mole) of freshly distilled propionyl chloride in 10 ml. of chloroform. After stirring over a weekend, thin layer chromatography indicated a small amount of starting amine remained. An additional 0.4 g. of propionyl chloride was added and the reaction mixture was stirred another two hours. Then 50 ml. of water was added, stirred 30 minutes and the chloroform layer was separated. After drying over magnesium sulfate, the organic layer was evaporated under reduced pressure to an oil. The oil was dissolved in hot isopropanol and treated with the calculated amount of fumaric acid in isopropanol. Addition of isopropyl ether to the solution precipitated 5.2 g. (73%) of product melting at 156–158°. Recrystallization from the same solvent did not change the melting point. A small sample of free base was converted to a hydrochloride which was crystallized from isopropanol-isopropyl ether and melted at 162–164°.

*Analysis.*—Calcd. for $C_{26}H_{33}ClN_2O_4$ (hydrochloride): C, 66.02; H, 7.03; N, 5.92. Found: C, 65.92; H, 1.02; N, 6.02.

Example 39: 5-[2-(4-propionoxy-4-phenylpiperidino)-ethyl]-2-oxazolidinone hydrochloride.—A stirred suspension of 5 g. (0.0172 mole) of 5-[2-(hydroxy-4-phenylpiperidino)ethyl]-2-oxazolidinone and 4 g. (0.027 mole) of potassium carbonate in 50 ml. of chloroform was treated slowly with 2.05 g. (0.021 mole) of freshly distilled propionyl chloride in 25 ml. of chloroform. The mixture was stirred 1.5 hours then treated with 50 ml. of water and stirred an additional 15 minutes. The chloroform layer was separated and the aqueous layer washed several times with chloroform. The combined chloroform extracts were dried over magnesium sulfate, then evaporated under reduced pressure to an oil which was taken up in isopropanol and treated with ethereal HCl. After cooling, 4 g. (61%) of hydrochloride salt precipitated, which melted at 195–196°. An analytical sample was recrystallized from isopropanol and melted at 186–188°. Thin layer chromatography of the free bases regenerated from the two differently melting salts showed identical spots.

Example 40: 3-benzyl-5-[2-(4-hydroxy-4-phenyl-piperidino)-ethyl]-2-oxazolidinone.—A mixture of 35 g. (0.145 mole) of 3-benzyl-5-(2-chloroethyl)-2-oxazolidinone, 25 g. (0.141 mole) of 4-hydroxy-4-phenylpiperidine and 20 g. (0.145 mole) of potassium carbonate in 300 ml. of n-butanol was refluxed under a nitrogen atmosphere for 16 hours. After cooling the salts were filtered off and the filtrate was evaporated under reduced pressure to an oil. Trituration with dry ether gave 38.6 g. (72.5%) of crude product. Recrystallization from benzene-isooctane gave 36 g. of pure product melting at 108–110°.

*Analysis.*—Calcd. for $C_{23}H_{28}N_2O_3$: C, 72.60; H, 7.42; N, 7.36. Found: C, 72.51; H, 7.34; N, 7.26.

Example 41: 5-[2-(4-hydroxy-4-phenylpiperidino)-ethyl]-2-oxazolidinone.—A suspension of 26 g. (0.0685 mole) of 3-benzyl-5-[2-(4-hydroxy-4-phenylpiperidino)ethyl]-2-oxazolidinone in 30 ml. of dry tetrahydrofuran (THF) was added slowly to a stirred solution of 3.3 g. (0.143 mole) of sodium in 200 ml. of liquid ammonia. A heavy precipitate formed during addition. Before addition was completed the characteristic blue color disappeared so an additional 1.5 g. of sodium was added to the mixture. After addition was complete, the mixture was stirred an additional 3 hours, whereafter the ammonia was allowed to evaporate slowly. The resulting solid was treated with 300 ml. of THF then slowly with 50 ml. of isopropanol followed by 300 ml. of salt water. The organic layer was separated and the water layer was extracted several times with additional THF. The combined organic extracts were evaporated to a solid which was taken up again in THF, dried over magnesium sulfate and concentrated. Addition of dry ether caused the product to precipitate, yield 13.5 g. (68%); M.P. 180–183°. Recrystallization from benzene-absolute alcohol did not change the melting point.

*Analysis.*—Calcd. for $C_{16}H_{22}N_2O_3$: C, 66.18; H, 7.64; N, 9.65. Found: C, 66.29; H, 7.73; N, 9.54.

Example 42: 3-benzyl-5-[2-(4-phenylpiperidino)-ethyl]-2-oxazolidinone.—A mixture of 20 g. (0.0835 mole) of 3-benzyl-5-(2-chloroethyl)-2-oxazolidinone, 13.5 g. (0.0835 mole) of 4-phenylpiperidine and 25.3 g. (0.25 mole) of potassium carbonate in 150 ml. of n-butanol was refluxed for 26 hours. The suspended salts were removed by filtration and the resulting filtrate evaporated under reduced pressure to an oil. The oil crystallized from benzene-isooctane, yield 15.9 g.; M.P. 96–98°. The filtrate was evaporated to an oil which was dissolved in benzene and chromatographed on 350 g. of Florisil adsorbent using benzene to elute. The partially purified oil was dissolved in ether and treated with 3 N HCl. Three layers formed. The aqueous layer and the insoluble salt layer were combined, neutralized with 3 N NaOH and the resulting oil extracted into chloroform. After drying over $MgSO_4$, the chloroform solution was evaporated to an oil (4 g.) which crystallized on seeding with the pure product, total yield 19.9 g. (67%).

Example 43: 5-[2-(4-phenylpiperidino)ethyl]-2-oxazolidinone.—A suspension of 18 g. (0.05 mole) of 3-benzyl-5-[2-(4-phenylpiperidino)-ethyl]-2-oxazolidinone in 30 ml. of tetrahydrofuran was added slowly to a stirred solution of 2.5 g. (0.11 mole) of sodium in 200 ml. of liquid ammonia. An additional 0.5 g. of sodium was added after addition in order to keep a slight excess present. After stirring 30 minutes ammonium chloride was added until the blue color disappeared, whereafter the ammonia was allowed to evaporate overnight. The resulting solid was treated with water and extracted into chloroform. The chloroform layer was extracted several times with 3 N HCl. Neutralization of the acid extract gave impure crystals of crude product. Recrystallization from ethyl acetate gave 4 g. of pure product melting at 134–137°.

Additional Type (IV) and (V) compounds prepared in the same manner from the appropriate selected starting materials include:

TYPE IV 3-methyl-5-{2-[3-(N-4 - methylthiophenyl) - N - methyl-aminopyrrolidino]ethyl}-2-oxazolidinone 3-methyl-5-{2-[3-(N-4-dimethylaminophenyl) - N-methyl-aminopyrrolidino]ethyl}-2-oxazolidinone 3-methyl-5-{2-[3-(N-3 - nitrophenyl) - N - methylamino-pyrrolidino]ethyl}-2-oxazolidinone

TYPE V 3-methyl-5-{2 - [4 - hydroxy - 4 - (2 - methylthiophenyl) piperidino]ethyl}-2-oxazolidinone 3-methyl-5-{2-[4-hydroxy - 4 - (3 - diethylaminophenyl) piperidino]ethyl}-2-oxazolidinone 3-methyl-5-{2-[4-hydroxy-4 - (3 - nitrophenyl)piperidino] ethyl}-2-oxazolidinone 3-ethyl - 5 - {2 - [4 - hydroxy - 4 - (2 - methylthiophenyl) piperidino]ethyl}-2-oxazolidinone 3-ethyl-5-{2-[4 - hydroxy - 4 - (3 - diethylaminophenyl) piperidino]ethyl}-2-oxazolidinone Where any of the foregoing examples produce a compound having a methyl or other lower-alkyl group, it is to be understood that the compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material. Similarly, other molecular changes within the scope of the invention are readily made.

All of the oxazolidinone compounds of any of the foregoing formulas, preparations, and examples, wherein R is other than hydrogen, in addition to the uses already given, are of value in that they can serve as starting material for hydrolysis to the corresponding open-chain compounds, in which the pre-existing oxazolidinone ring has been opened with splitting out of carbon dioxide, to yield compounds of the formula:

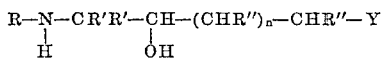

wherein $n$ is zero, 1 or 2, Y as previously defined in Formula XII is the remainder of the molecule, and wherein R, R', and R" are as defined for Formula I. These open chain alcohols are of value as intermediates for the synthesis of other valuable compounds such as compounds of Formula XII, especially compounds of Formula I with carbon-$C^{14}$ in the 2 position of the oxazolidinone ring. Such compounds are prepared by reacting the open chain alcohols with urea-$C^{14}$, phosgene-$C^{14}$, diethyl carbonate-$C^{14}$, or the like. The radioactively labeled compounds are valuable as tracers in establishing the metabolism distribution and excretion of the compounds of Formula XII in living organisms.

The compounds of the invention having the foregoing formulas, especially those formulas identified as I, II, IV and V are generally characterized by important pharmacological activity, indicative of their use in counteracting certain physiological abnormalities in an animal body. The compounds of Formula I are major tranquilizers. Certain compounds of the series are extremely potent and long-lasting. While the degree and relative degree of their activity varies, all compounds of this group tested exhibited major tranquillizing activity. The salts have special utility in that they are water-soluble.

The compounds of the invention which have a basic (amino) nitrogen atom in the molecule are most conveniently employed in the form of non-toxic acid-addition salts. Such salts also have improved water-solubility. Although the non-toxic salts are preferred, any salt may be prepared for use as a chemical intermediate, as in the preparation of another but non-toxic acid-addition salt. The free basic compounds, of Formula I and other formulas herein wherein the requisite basic (amino) nitrogen atom is present, may be conveniently converted to their acid addition salts by reaction of the free base with the selected acid. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, maleic acid, and tartaric acid. The preferred acid addition salt is generally the hydrochloride, maleate, or fumarate.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition salts may be obtained by employing the proper increased molar ratios of ester or acid to the free base.

FORMULATION AND ADMINISTRATION

Effective quantities of any of the foregoing pharmacologically active compounds of Formulas I, II, IV, and V, may be administered to a living animal body in any one of various ways, for example, orally as in capsules or tablets, parenterally in the form of sterile solutions or suspensions, and in some cases intravenously, e.g., in the form of sterile isotonic solutions. The compounds may be administered alone or in combination with other pharmacologically effective agents, such as analgesics, sedatives, antacids, other tranquilizing agents, antiappetite or antiulcer drugs, or the like, as well as buffers and usual pharmaceutical carriers or diluents. The free basic amino compounds, while effective, are preferably formulated and administered in the form of their non-toxic acid-addition salts for purposes of convenience of crystallization, increased solubility, and the like. The compounds of Formula I, especially in the form of their acid-addition salts, represent a preferred group of highly active compounds, of which the phenylpiperazino compounds are outstandingly active. Preferred groups at the 3-position are hydrogen, methyl or ethyl, and at the 5-position a phenylpiperazinoethyl group, as compounds with these characteristic groups are outstanding in their activity.

Although very small quantities of the active materials of the present invention, having Formulas I, II, IV, and V, are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of the following example are representative for all of the pharmacologically active compounds of the invention, including the compounds of Formulas I, II, IV, and V, but have been eespecially designed to embody as active ingredient a compound of Formula I, especially a Formula I compound wherein the 5 side chain is a phenylpiperazinoethyl side chain and the 3-R group is preferably hydrogen, methyl or ethyl, especially their maleates, fumarates, hydrochlorides, hydrobromides, or like pharmaceutically acceptable salts, and particularly the compound of Example 10 designated AHR–1209 and physiologically acceptable acid addition salts thereof.

Example formulations (1) Capsules.—Capsules of 5 mg., 25 mg., and 50 mg. of active ingredient per capsule are prepared. With the higher amounts of active ingredient, reduction may be made in the amount of lactose.

Typical blend for encapsulation: Per capsule, mg.
Active ingredient, as salt _____ 5.0
Lactose _____ 296.7
Starch _____ 129.0
Magnesium stearate _____ 4.3

Total _____ 435.0

Additional capsule formulations preferably contain a higher dosage of active ingredient and are as follows:

| Ingredients | 100 mg. per capsule | 250 mg. per capsule | 500 mg. per capsule |
| --- | --- | --- | --- |
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets.—A typical formulation for a tablet containing 5.0 mg. of active ingredient per tablet follows. The formulation may be used for other strengths of active ingredient by adjustment of weight of dicalcium phosphate.

Per tablet, mg.
(1) Active ingredient _____ 5.0
(2) Corn starch _____ 13.6
(3) Corn starch (paste) _____ 3.4
(4) Lactose _____ 79.2
(5) Dicalcium phosphate _____ 68.0
(6) Calcium stearate _____ 0.9

Total _____ 170.1

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredients and are as follows:

A. 50 mg. tablet

Ingredients: Per tablet, mg.
Active ingredient, as salt _____ 50.0
Lactose _____ 90.0
Milo starch _____ 20.0
Corn starch _____ 38.0
Calcium stearate _____ 2.0

Total _____ 200.0

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

B. 100 mg. tablet

Ingredients: Per tablet, mg.
Active ingredient, as salt _____ 100.0
Lactose _____ 190.0
Dicalcium phosphate _____ 172.2
Starch _____ 54.0
Milo starch _____ 21.6
Calcium stearate _____ 2.2

Total _____ 540.0

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

C. 250 mg. tablet

Ingredients: Per tablet, mg.
Active ingredient, as salt _____ 250.0
Corn starch _____ 56.0
Carbowax 6000 polyethylene glycol of M.W. approximately 6000) _____ 25.0
Lactose _____ 4.0
Magnesium stearate _____ 4.0

Total _____ 370.0

Uniformly blend the active ingredient, Carbowax 6000, lactose, and one-half the weight of magnesium stearate required. This blend is then "slugged" on a suitable tablet press. These "slugs" are granulated through a ten mesh screen of an oscillating granulator. These granules are then blended with the remainder of the magnesium stearate and the lubricated granules are then converted into tablets on a suitable tablet press.

D. 500 mg. tablet

| Ingredients: | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) Injectable (2% sterile solution) per cc.: active ingredient 20 mg.; preservative, e.g., chlorobutanol 0.5% weight/volume; and water for injection, q.s. Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Compounds having the Formula I wherein P is phenyl or substituted phenyl may also conveniently be prepared by the presenti nvention may also be administered succesamine. The compound thus produced has the Formula XII wherein Y is diethanolamino. When the R group is benzyl, this may be converted to hydrogen according to debenzylation Step C. The resulting compound is reacted with thionyl chloride or thionyl bromide to replace the hydroxy groups with halogen as shown in Formula C (see Alternate Scheme). The desired compounds are produced by reacting dihaloethylamine intermediate with aniline or substituted anilines. This method is particularly useful to produce compounds wherein the R of a compound of Formula I is H and a substituent on the aryl group P of a compound of Formula I is of the nature (i.e., halogen, trifluoromethyl, nitro, alkylmercapto, or the like) that it might be affected under conditions of removal of the N-benzyl group in a Step C debenzylation reaction.

EXAMPLES 3-benzyl-5-[2-(2,2'-diethanolamino)-ethyl]-2-oxazolidinone

A mixture of 173 g. (0.722 mole) of 3-benzyl-5-(2-chloroethyl)-2-oxazolidinone, 2,2'-diethanolamine (76 g., 0.722 mole) and anhydrous potassium carbonate (100 g., 0.722 mole) and 500 ml. of n-butanol is stirred and refluxed for 18 hours. The reaction mixture is suction filtered while hot and the n-butanol is removed on a steam bath at reduced pressure (approximately 100 mm.). A quantitative yield of crude product was obtained.

5-[2-(2,2'-diethanolamino) - ethyl] - 2 - oxazolidinone hydrochloride

A solution of 3-benzyl-5-[2-(2,2'-diethanolamino)-ethyl]-2-oxazolidinone (30.8 g., 0.10 mole) in 100 ml. of tetrahydrofuran is added dropwise to a stirred solution of sodium (9.7 g., 0.42 mole) in 200 ml. of liquid ammonia. After addition is completed, the mixture is stirred for one hour and then decomposed by the careful addition of ammonium chloride (26.6 g., 0.50 mole). The ammonia is allowed to evaporate, the tetrahydrofuran is removed under reduced pressure and absolute ethanol is added to the residue. The solution is filtered free of sodium chloride, the filtrate acidified by the addition of anhydrous hydrogen chloride and the acidic solution is concentrated to an oily residue. The crude residue is used without further purification for the preparation of 5-{2-[N-(2,2'-dichlorodiethylamino)]ethyl}-2 - oxazolidinone, i.e., (5-[2-(2,2'-imino-diethanol)ethyl]-2-oxazolidinone).

5-{2-[N-(2,2'-dichlorodiethylamino)'] - ethyl} - 2-oxazolidinone

Crude 5-[2-(2,2'-iminodiethanol)-ethyl]-2-oxalidinone is stirred fifteen minutes at room temperature with 100 ml. of thionyl chloride. After two hours heating at 60°, the reaction mixture is filtered and the filtrate concentrated at the reduced pressure of the water pump. An IR of the residue indicated the reaction had gone to completion. The crude residue of 5-{2-[N-(2,2'-dichlorodiethylamino)]-ethyl}-2-oxazolidinone is used without further purification-in the form of its hydrochloride salt.

5-{2-[4-(4-chlorophenyl)-1-piperazino]-ethyl} - 2 - oxazolidinone fumarate p-Chloroaniline (26.1 g., 0.206 mole) is added to a solution of 5-{2-[N-(2,2'-dichlorodiethylamino)]-ethyl}-2-oxazolidinone hydrochloride (18.1 g., 0.062 mole) in 250 ml. of isopropanol and the stirred mixture is refluxed eighteen hours. The reaction mixture is treated with ammonia at 4–10°, the ammonium chloride removed by filtration and the isopropanol stripped from the filtrate. Unreacted p-chloroaniline is removed by vigorous stirring of the residue with 200 ml. of isooctane at 60°. The dried residue (18.3 g., 0.0586 mole) is dissolved in 50 ml. of ethyl acetate and the solution treated with fumaric acid (6.9 g., 0.0594 mole) dissolved in the minimum amount of methanol. Recrystallization of the crude fumarate from methyl ethyl ketone gave 4.7 g. (17%) of the title compound; M.P. 198.5–203°.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

ALTERNATE SCHEME

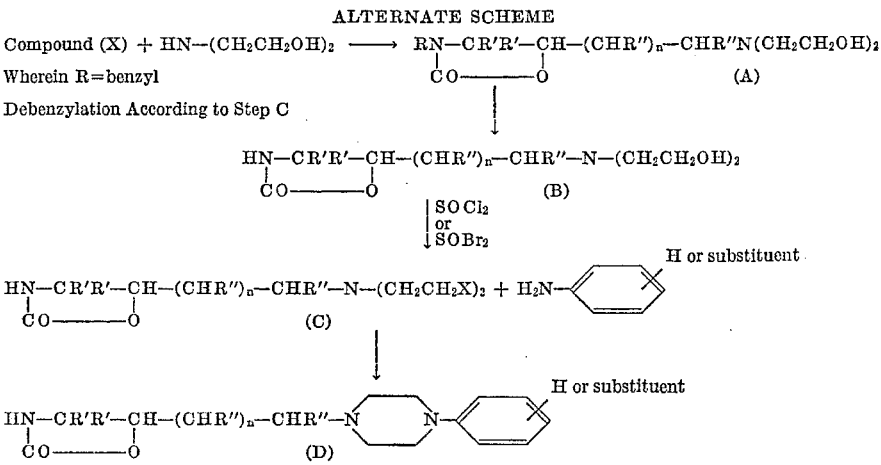

"Substituent," e.g., may be halo, lower-alkyl, lower-alkoxy-trifluoromethyl, lower-alkylmercapto, dilower-alkylamino, or nitro.

We claim:

1. A 5-omega-substituted 2-oxazolidinone selected from the group consisting of (A) compounds of the formula:

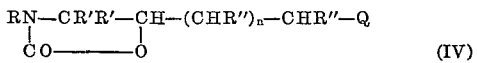

wherein n is selected from the group consisting of 1 and 2; R is selected from the group consisting of hydrogen, lower-alkyl, lower-cycloalkyl, phenyl-lower-alkyl, and substituted phenyl-lower-alkyl wherein the substituents are selected from the group consisting of halo, lower-alkyl, lower-alkoxy, trifluoromethyl, lower-alkylmercapto, di-lower-alkylamino, and nitro; R' is selected from the group consisting of hydrogen and methyl; R" is selected from the group consisting of hydrogen and methyl; Q is selected from the group consisting of

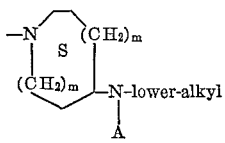

and

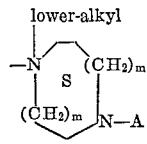

wherin m is selected from one and zero, no more than one m being one; and A is phenyl, substituted phenyl wherein the substituents are selected from the group consisting of halo, lower-alkyl, lower-alkoxy, trifluoromethyl, lower-alkylmercapto, di-lower-alkylamino, and nitro; and (B) pharmaceutically acceptable acid addition salts thereof.

2. A compound of claim 1 which is 3-benzyl-5-{2-[N-methyl - N - (1 - phenyl-3-pyrrolidinyl)-amino]ethyl}-2-oxazolidinone.

3. A compound of claim 1 which is 5-{2-[N-methyl-N-(1 - phenyl-3-pyrrolidinyl)-amino]ethyl}-2-oxazolidinone.

4. A compound of claim 1 which is 3-benzyl-5-[2-(3-methylanilinopyrrolidino)-ethyl]-2-oxazolidinone.

5. A compound of claim 1 which is 3-benzyl-5-[2-(3-methylanilinopyrrolidino) - ethyl] - 2 - oxazolidinone acid addition salts.

6. A compound of claim 1 which is 5-[2-(3-methylanilinopyrrolidino)ethyl]-2-oxazolidinone.

7. A 5-omega-substituted 2-oxazolidinone selected from the group consisting of (A) compounds of the formula:

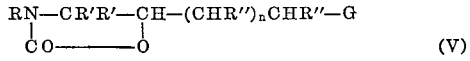

wherein n is selected from the group consisting of 1 and 2; R is selected from the group consisting of hydrogen, lower-alkyl, lower-cycloalkyl, phenyl-lower-alkyl, and substituted phenyl-lower-alkyl wherein the substituents are selected from the group consisting of halo, lower-alkyl, lower-alkoxy, trifluoromethyl, lower-alkylmercapto, di-lower-alkylamino, and nitro; R' is selected from the group consisting of hydrogen and methyl; R" is selected from the group consisting of hydrogen and methyl; G has the formula

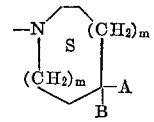

wherein m is selected from zero and one, no more than one m being one; B is selected from the group consisting of hydrogen, hydroxy, lower-alkanoyloxy, carboxy, and carblower-alkoxy; A is phenyl, substituted phenyl wherein the substituents are selected from the group consisting of halo, lower-alkyl, lower-alkoxy, trifluoromethyl, lower-alkylmercapto, di-lower-alkylamino, and nitro; and (B) pharmaceutically acceptable acid addition salts thereof.

8. A compound of claim 7 which is 3-benzyl-5-[2-(4-ethylcarboxylate - 4 - phenylpiperidino)ethyl]-2-oxazolidinone.

9. A compound of claim 7 which is 5-[2-(4-carboxy-4-phenylpiperidino)ethyl]-2-oxazolidinone.

10. A compound of claim 7 which is 5-[2-(4-ethylcarboxylate - 4 - phenylpiperidino)ethyl]-2-oxazolidinone.

11. A compound of claim 7 which is 3-benzyl-5-[2-(4-propionoxy-4-phenylpiperidino) - ethyl]-2-oxazolidinone.

12. A compound of claim 7 which is a 3-benzyl-5-[2-(4-propionoxy - 4 - phenylpiperidino) - ethyl] - 2 - oxazolidinone pharmaceutically acceptable acid addition salt.

13. A compound of claim 7 which is 5-[2-(4-propionoxy-4-phenylpiperidino) - ethyl]-2-oxazolidinone.

14. A compound of claim 7 which is a 5-[2-(4-propionoxy - 4 - phenylpiperidino) - ethyl]-2-oxazolidinone pharmaceutically acceptable acid addition salt.

15. A compound of claim 7 which is 3-benzyl-5-[2-(4-hydroxy-4-phenylpiperidino)-ethyl]-2-oxazolidinone.

16. A compound of claim 7 which is 5-[2-(4-hydroxy-4-phenylpiperidino)-ethyl]-2-oxazolidinone.

17. A compound of claim 7 which is 3-benzyl-5-[2-(4-phenylpiperidino)-ethyl]-2-oxazolidinone.

18. A compound of claim 7 which is 5-[2-(4-phenylpiperidino)ethyl]-2-oxazolidinone.

References Cited

UNITED STATES PATENTS 3,399,192   8/1968   Regnier et al. _____ 260—240

HENRY R. JILES, Primary Examiner

G. T. TODD, Assistant Examiner

U.S. Cl. X.R.

260—239, 268, 294.3, 307, 326.85; 424—267, 272

UNITED STATES PATENT OFFICE
CERTIFICATE OF CORRECTION

Patent No. 3,457,267                        April      1970

Carl D. Lunsford et al.       PAGE - 1

It is hereby certified that errors appear in the above-identified patent and that said Letters Patent are hereby corrected as shown below:

Column 1, line 58
Appl. Page 1, line 14      : "(CHR")$_n$ - N s N - P" should read ---(CHR")$_n$ - CHR" - N s N - P ---

Column 2, line 15
Appl. Page 2, line 14      : "RN - CR'R' - CHR" " should read
                                    CO―――――O

---RN - CR'R' - CH - CHR" ---
                                       CO―――――O

Column 2, line 45
Appl. Page 3, line 4       : "consists of including convulsions"

should read

--- consists of inducing convulsions ---

Column 3, line 27
Appl. Page 4, line 28      : "lower-alkyl

-N-    S     (CH$_2$)$_m$
                                   (CH$_2$)$_m$   N - A "     should read ---lower-alkyl -N               (CH$_2$)
                                           S                  m
                                   (CH$_2$)$_m$        N - A ---

Column 4, line 7
Appl. Page 6, line 24      : "the 2-, 3- or 4-pyridyl"

should read

---the 2, 3- or 4-pyridyl ---

Column 5, line 14
Appl. Page 9, line 3       : "may be generall"

should read 3,457,267    PAGE - 2

Column 5, line 59
Appl. Page 10, line 15    : "Step A1: RNCO"

should read

---Step A1: RNCO (X) ---

Column 6, lines 16-22
Appl. Page 11, lines 13-14: "(XX)    R'CR'—CH
                            H₂NCOO    OH
                                        ↓
                                      (X) R=H"    Should read --- (XX)    R'CR'—CH—
            H₂NCOO    OH
                        ↓
                      (X)  R=H ---

Column 7, line 59
Appl. Page 13, line 25    : "STEPS AL-A7"

should read

--- STEPS A1 thru A7 ---

Column 12, line 54,55,56 :
Appl. Page 25, line 4    : 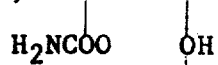

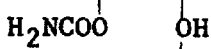    should read

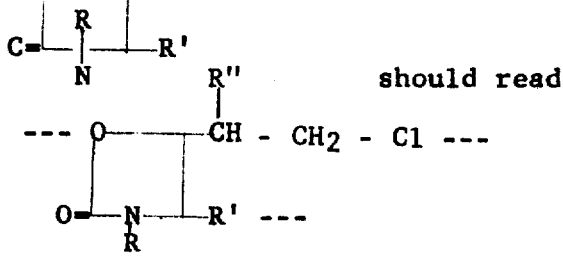

Column 21, line 54
Appl. Page 47, line 30    : "Found: C, 65.92; H, 1.02"

should read

--- Found: C, 65.92; H, 7.02 ---

Column 26, line 64
Appl. Page 60, line 27    : "Lactose------------ 4.0"

should read

--- Lactose---------- 35.0 ---

Column 27, lines 32-33
Appl. Page 62, line 9    : "by the presenti nvention may also be administered succesamine."

should read

---by reacting a compound of formula X with diethanolamine. ---

Column 29, line 30
Appl. Page 63, line 24 : " 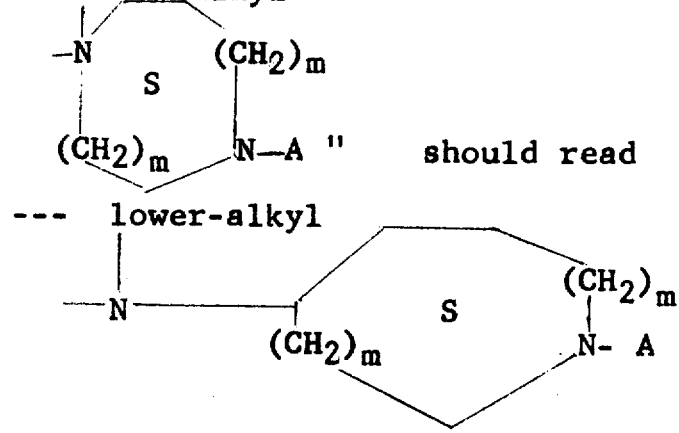 should read
--- lower-alkyl
(SEAL)
Attest:
Edward M. Fletcher, Jr.
Attesting Officer
WILLIAM E. SCHUYLER, JR.
Commissioner of Patents

UNITED STATES PATENT OFFICE

CERTIFICATE OF CORRECTION

Patent No. 3,457,267                            April      1970

Carl D. Lunsford et al.

It is hereby certified that errors appear in the above-identified patent and that said Letters Patent are hereby corrected as shown below:

Column 5, line 28
Appl. Page 9, line 16     : "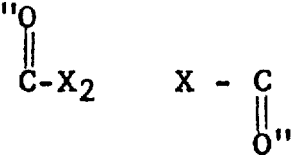 should read

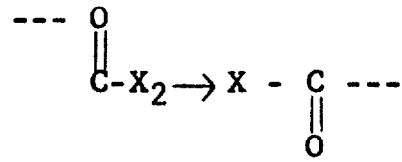

(SEAL)
Attest:

Edward M. Fletcher, Jr.
Attesting Officer

WILLIAM E. SCHUYLER, JR.
Commissioner of Patents